United States Patent [19]

Morris et al.

[11] Patent Number: 5,772,397
[45] Date of Patent: Jun. 30, 1998

[54] GAS TURBINE AIRFOIL WITH AFT INTERNAL COOLING

[75] Inventors: Mark C. Morris, Phoenix; Nnawuihe A. Okpara, Peoria; Michael K. Bischoff, Mesa, all of Ariz.

[73] Assignee: AlliedSignal Inc., Morris Township, N.J.

[21] Appl. No.: 740,037

[22] Filed: Oct. 23, 1996

Related U.S. Application Data

[63] Continuation-in-part of Ser. No. 647,079, May 8, 1996, Pat. No. 5,601,399.

[51] Int. Cl.[6] .................................................... F04D 29/38
[52] U.S. Cl. .......................................... 415/115; 416/96 R
[58] Field of Search ..................................... 415/115, 116; 416/97 R, 96 R

[56] References Cited

U.S. PATENT DOCUMENTS

| | | |
|---|---|---|
| 3,574,481 | 4/1971 | Pyne . |
| 3,885,609 | 5/1975 | Frei et al. .............................. 416/97 R |
| 4,105,364 | 8/1978 | Dodd . |
| 4,278,400 | 7/1981 | Yamarik et al. . |
| 4,403,917 | 9/1983 | Laffitte et al. . |
| 4,456,428 | 6/1984 | Cuvillier . |
| 4,515,523 | 5/1985 | North et al. ........................... 416/97 R |
| 5,246,341 | 9/1993 | Hall et al. .............................. 416/97 R |
| 5,288,207 | 2/1994 | Linask ................................... 416/97 R |
| 5,337,805 | 8/1994 | Green et al. . |
| 5,342,172 | 8/1994 | Coudray et al. . |
| 5,462,405 | 10/1995 | Hoff et al. ............................. 416/97 R |
| 5,601,399 | 2/1997 | Okoara et al. .......................... 415/115 |

FOREIGN PATENT DOCUMENTS

| | | | |
|---|---|---|---|
| 34961 | 9/1981 | European Pat. Off. ............. | 416/97 R |
| 358525 | 1/1973 | U.S.S.R. .............................. | 416/97 R |

*Primary Examiner*—John T. Kwon
*Attorney, Agent, or Firm*—Jerry J. Holden

[57] ABSTRACT

A gas turbine vane or blade having a novel internal structure that allows for cooling under diverse pressure ratios. The vane has an air inlet passage that communicates with an inner cooling cavity positioned between the air passage and the vane's trailing edge. Disposed within this cavity are deflectors, turning members, ribs, and deflecting pins arranged so as to direct the cooling air through the cavity in a manner that minimizes pressure loss. Thus maintaining the velocity and flow of the cooling air.

13 Claims, 4 Drawing Sheets

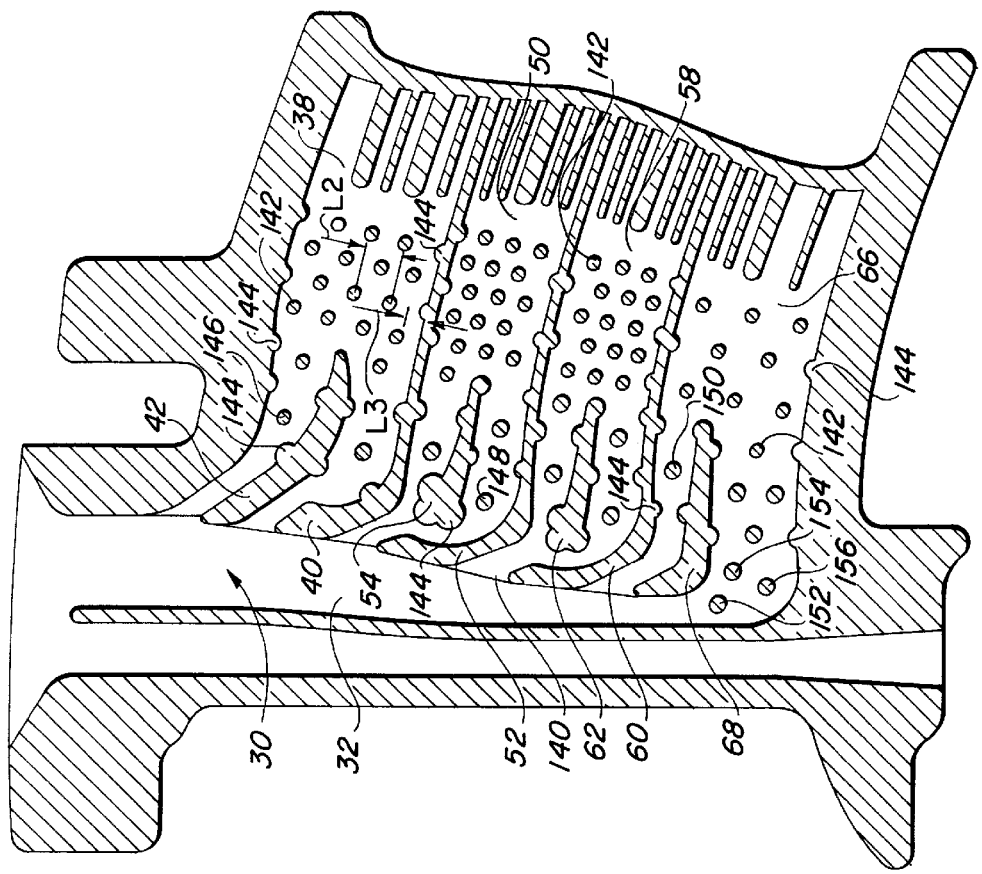
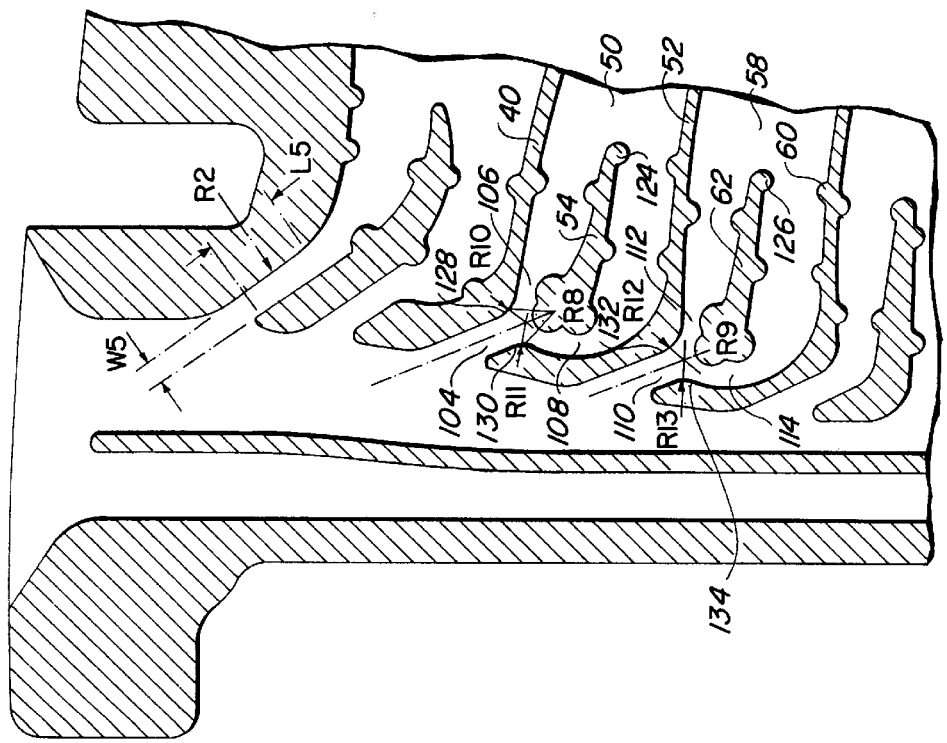

GAS TURBINE AIRFOIL WITH AFT INTERNAL COOLING

CROSS-REFERENCE TO RELATED APPLICATION

This is a continuation-in-part of U.S. patent application Ser. No. 08/647,079, filed May 8, 1996 now U.S. Pat. No. 5,601,399.

GOVERNMENT RIGHTS

This invention was made with Government support under Contract No, DMJ02-94-C-0030 awarded by the United States Army. The Government has certain rights in this invention.

TECHNICAL FIELD

The present invention relates generally to gas turbine engine nozzles, vanes, and blades, and more particularly to the configuration of the inner cooling chamber of such airfoils.

BACKGROUND ART AND TECHNICAL PROBLEMS

As is known, generally gas turbine engines comprise a compressor section, a combustion chamber, and a turbine section. In general, the compressor section draws in air and compresses it. Fuel is then added to the compressed air in the combustion chamber, and the mixed fluid of fuel and compressed air is ignited. The fluid, which is at a temperature in the range of about 1700–2600 degrees Fahrenheit after ignition, is directed toward the turbine section where part of the energy in the fluid is extracted by the turbine blades which are mounted to a rotatable shaft. The rotating shaft in turn drives a compressor in the compressor section. The remainder of the energy is used for other functions; for example, the propulsive thrust of a jet aircraft.

To better improve the efficiency of the energy transfer from the fluid to the turbine blades, the angle of attack of the fluid onto the turbine blades is improved by use of non-rotating airfoil shaped fluid nozzles or vanes. These nozzles or vanes swirl the flow of the hot gas or fluid from a nearly parallel flow with the blades to a generally circumferential flow onto the blades. Because the combusted fluid is at a very high temperature when it comes in contact with the vane, the vane must be designed to withstand high temperatures for long periods of time.

Conventional gas turbine nozzles, vanes, and blades are generally internally cooled by pumping a portion of the compressed air through an internal cooling cavity in the airfoil. However, the cooling cavities currently known in the art are designed for high pressure drop, high velocity air flow systems and will not effectively cool airfoils used in low pressure ratio engines. Examples of the conventional prior art include U.S. Pat. Nos.: 3,574,481 to Pyne, Jr. entitled "Variable Area Cooled Airfoil Construction for Gas Turbines," 4,105,364 to Dodd entitled "Vane for a Gas Turbine Engine Having Means for Impingement Cooling Thereof," 4,278,400 to Yamarik, et al. entitled "Coolable Rotor Blade," 4,403,917 to Laffitte, et al. entitled "Turbine Distributor Vane," 4,456,428 to Cuvillier entitled "Apparatus for Cooling Turbine Blades," 4,515,523 to North, et al. entitled "Cooling Arrangement for Airfoil Stator Vane Trailing Edge," 5,288,207 to Linask entitled "Internally Cooled Turbine Airfoil," 5,337,805 to Green, et al. entitled "Airfoil Core Trailing Edge Region," and 5,342,172 to Coudray, et al. entitled "Cooled Turbo-Machine Vane."

As will be appreciated, there exists a need for an airfoil with an aft portion internal cooling arrangement that improves the thermal cooling effectiveness of the airfoil for a given pressure differential between the cooling air inlet and exit.

SUMMARY OF THE INVENTION

A gas turbine vane or blade according to the present invention addresses many of the shortcomings of the prior art.

In accordance with one aspect of the present invention, a turbine vane comprises an air inlet opening located at a first side of the vane, a first air passage extending along a leading edge from the first side to a second side, wherein the first air passage communicates with the air inlet opening, and an inner cooling cavity positioned between the first air passage and a trailing edge and separated from the first air passage by a divider. This portion of the vane between the divider and the trailing edge is referred to as the aft portion. In accordance with this aspect of the invention, the inner cooling cavity comprises first, second and third channel deflectors, each of which extend from the trailing edge of the vane towards the divider. The inner cooling cavity further comprises first and second outer turning members and first and second inner turning members positioned within the inner cooling cavity.

In accordance with yet another aspect of the present invention, the inner cooling cavity of the gas turbine vane includes a plurality of air deflecting pins positioned throughout the cavity.

In accordance with still another aspect of the present invention, the inner walls of the first and second sides, the channel deflectors and the turning members include at least one half pin.

In accordance with yet another aspect of the present invention, the inner walls of the first and second sides and the channel deflectors form a series of air channels, each air channel comprising at least one air flow separator extending from the trailing edge of the vane. The air channels may comprise at least one rib, and the channel deflectors may be hook-shaped, In yet another aspect of the present invention, the same air passage and cooling cavity design is used for gas turbine blades.

BRIEF DESCRIPTION OF THE DRAWINGS FIGURES

Preferred exemplary embodiments of the present invention will hereafter be described in conjunction with the appended drawing figures, wherein like designations denote like elements, and:

FIG. 3 shows an enlarged portion of the inner cooling cavity of FIG. 1, highlighting the shape and configuration of the first tube and the radii of the inner turning members;

FIG. 4 shows the gas turbine vane of FIG. 1 highlighting the location and configuration of the air deflecting pins.

DETAILED DESCRIPTION OF PREFERRED EXEMPLARY EMBODIMENTS

The present invention generally relates to internally cooled gas turbine airfoils such as nozzles, vanes, and blades. However, the preferred exemplary embodiment discussed herein relates to one embodiment of a nozzle or vane.

Figure 1:
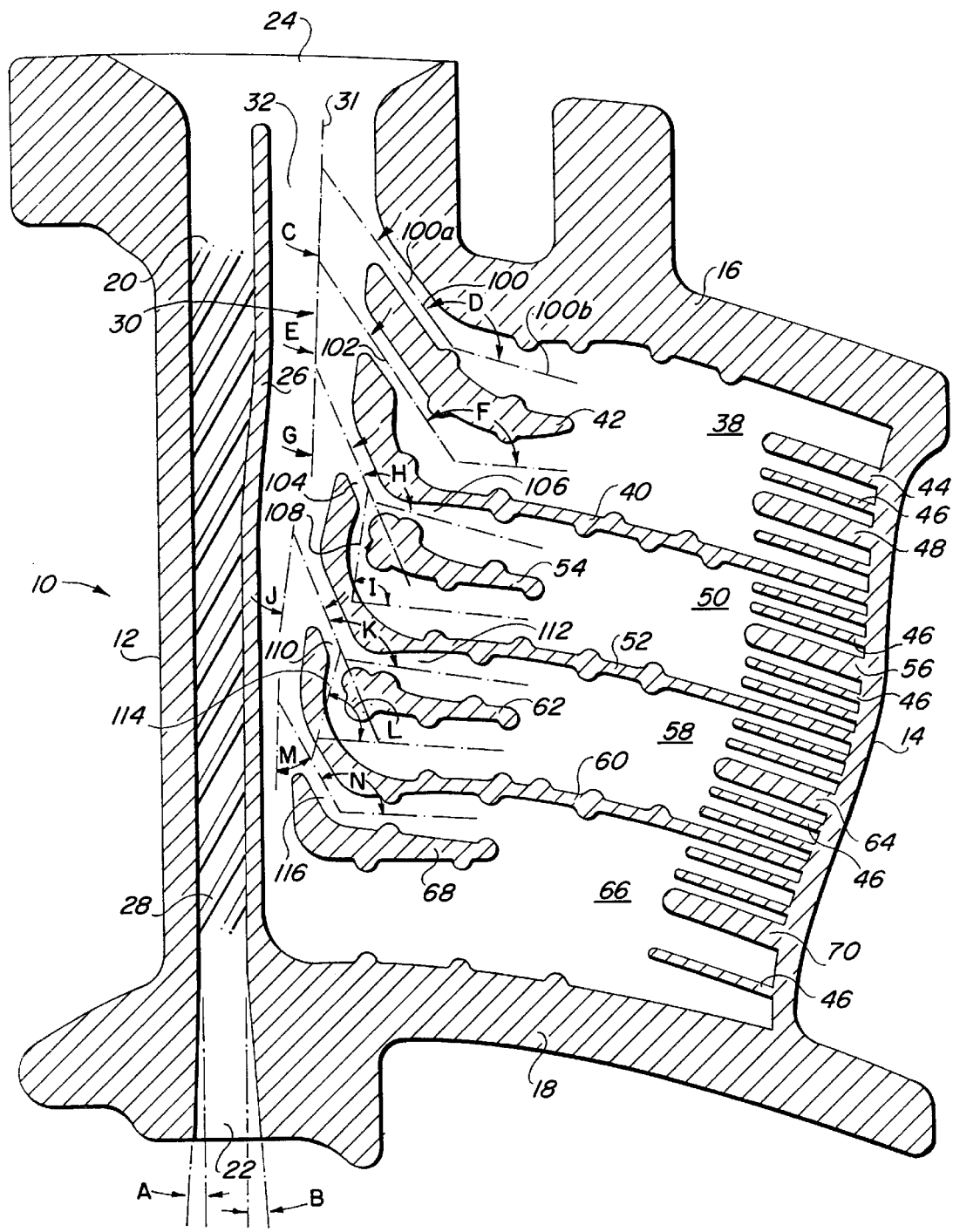
FIG. 1 is a cross-sectional view showing the inner cooling area of a gas turbine vane which embodies a first embodiment of the present invention.

Referring now to FIG. 1, a vane 10 of the present invention generally is cooled by pumping a fluid, relatively cooler than the gas flowing across the surfaces of the vane 10, into cooling passages formed on the inside of vane 10. In accordance with various embodiments of the present invention, the particular configuration of the cooling passages in vane 10 force air to evenly circulate throughout the entire cooling passage thereby evenly cooling the entire vane which may be used in both low and high pressure ratio engines.

Now describing vane 10 in more detail, vane 10 preferably comprises a leading edge 12, a trailing edge 14, a first side 16, a second side 18, a first air passage 20, and an inner cooling cavity 30.

First air passage 20 is located adjacent to and extends along leading edge 12 from first side 16 to second side 18. One end of air passage 20 communicates with and opens into an air inlet opening 24 located at first side 16, whereas the other end of air passage 20 communicates with second side 18 at an opening 22. As can be appreciated by one skilled in the art, as air or fluid passes through first air passage 20 from air inlet opening 24 to opening 22, leading edge 12 is cooled.

In a preferred exemplary embodiment of the present invention, air passage 20 may have an effective diameter in the range of about 0.04 inches to about 0.3 inches, depending on the size of the vane 10. In addition, as shown in FIG. 1, in a preferred embodiment of the present invention, the end of air passage 20 that communicates with second side 18 may flare out. More particularly, as shown by angles A and B, the angle of taper of air passage 20 may be in the range of about 2.75 to 4.25 degrees.

Preferably, first air passage 20 includes a rib or turbulator 28 extending from the inner wall of passage 20 in a generally helical pattern. Rib 28 suitably disrupts the boundary layer of the air or fluid as it passes through first air passage 20 allowing the fluid to more adequately cool leading edge 12. In accordance with one aspect of the preferred embodiment of the present invention, rib 28 may have a width in the range of about 0.01 to about 0.02 inches and preferably about 0.015 inches. Similarly, the height of rib 28 may be in the range of about 0.005 to about 0.015 inches and preferably about 0.010 inches. Nevertheless, as one skilled in the art can appreciate, rib 28 may be any size and pattern suitable for adequately cooling air passage 20, and in some cases, may be omitted.

With continued reference to FIG. 1, inner cooling cavity 30 is suitably oriented between first air passage 20 and trailing edge 14, and air passage 20 and cavity 30 are preferably separated by a divider 26. As air or fluid enters into air inlet opening 24, divider 26 suitably causes a portion of the air or fluid to pass into first air passage 20, and another portion to pass into cavity 30 via an inner air passage 32.

In general, cavity 30, as disclosed herein, comprises a plurality of air channels defined by respective deflectors and includes respective turning members and strategically located air deflecting pins. In particular, in accordance with a preferred exemplary embodiment of the present invention, air passage 32 communicates with and feeds a plurality of air channels 38, 50, 58, and 66.

First air channel 38 is formed between first side 16 and a generally hook-shaped first channel deflector 40. Preferably, deflector 40 spans from air passage 32 to trailing edge 14. Positioned between side 16 and deflector 40 and in fluid communication with air passage 32 is a first outer turning member 42 suitably configured to deflect and direct the air or fluid as it enters channel 38, thereby maintaining the fluid's velocity and pressure as it passes into and through channel 38.

Second air channel 50 is formed between deflector 40 and a second channel deflector 52. Preferably, deflector 52 evidences a configuration similar to deflector 40. Positioned between deflectors 40 and 52 and in fluid communication with air passage 32 is a first inner turning member 54 suitably configured to direct the fluid flow. In accordance with similar configurations, third air channel 58 is formed between deflector 52 and a similarly configured third channel deflector 60, and fourth air channel 66 is positioned between deflector 60 and second side 18. Both in fluid communication with air passage 32 and suitably configured to direct fluid flow, a second inner turning member 62 is positioned between deflectors 52 and 60, and a second outer turning member 68 is positioned between deflector 66 and side 18.

In a preferred exemplary embodiment of the invention, as air passage 32 extends along divider 26 from air channel 38 to air channel 66, it preferably tapers inward, thereby maintaining the pressure and velocity of the fluid as it flows from inlet opening 24 to air channel 66. That is, air passage 32 may be suitably configured such that the effective diameter of air passage 32 where it communicates with air inlet opening 24 is greater than its effective diameter where it communicates with air channel 66, thereby defining a centerline 31 through the air passage 32 that is disposed from the divider 26 by an angle in the range of 2 to 5 degrees. In a preferred exemplary embodiment of the present invention, the diameter of air passage 32 at opening 24 is preferably in the range of about 0.05 inches to about 0.5 inches depending on the size of the vane. Similarly, the diameter of air passage 32 between divider 26 and outer turning member 68 is in the range of about 0.05 inches to about 0.15 inches.

Still referring to FIG. 1, in accordance with a further aspect of a preferred embodiment of the invention, air channels 38, 50, 58 and 66 may include at least one air flow separator extending from trailing edge 14 toward leading edge 12. In a preferred embodiment of the invention, first channel 38 may suitably include flow separators 44 and 48, second channel 50 may include flow separator 56, third channel 58 may include flow separator 64, and fourth channel 66 may include flow separator 70. Further, channels 38, 50, 58 and 66 may include a plurality of ribs 46 that generally extend from an inner wall of cavity 30 partially into the cavity and, preferably, are positioned at trailing edge 14 between the flow separators, channel deflectors, and first and second sides 16, 18. It should be noted that to reduce the cost of producing the vane, it may be desirable to produce the vane without the various flow separators and ribs. Therefore, a preferred embodiment of the invention may exclude the flow separators and/or ribs located at the trailing edge.

Still referring to FIG. 1, in accordance with a preferred exemplary embodiment of the present invention, channel deflectors 40, 52 and 60, and turning members 42, 54, 62 and 68 are generally arcuate or hook-shaped and are suitably defined by a plurality of angles shown in FIG. 1 as angles C–N and described in more detail below.

In particular, in accordance with a preferred embodiment, the leading edges of turning members 42, 54, 62 and 68, and channel deflectors 40, 52 and 60, all of which communicate with air passage 32, preferably curve toward air inlet opening 24, creating angled air tubes 100, 102, 104, 110 and 116. The angles at which these tubes communicate with air passage 32 help dictate the volume and the velocity of the air that passes into each channel. The relative angles of the tubes with respect to passage 32 are measured as the angle created between the centerline of each tube and the centerline 31 of air passage 32. These angles are illustrated in FIG. 1 as angles C, E, G, J and M and are generally in the range of about 20 to about 45 degrees.

More particularly, tube 100 is suitably formed between side 16 and turning member 42 and evidences an angle C with respect to air passage 32, generally in the range of about 32 to about 42 degrees and preferably about 36 degrees. Further, tube 102 is formed between turning member 42 and deflector 40 and preferably evidences an angle E, which is generally in the range of about 33 to about 43 degrees and preferably about 37.7 degrees. Tube 104 is suitably formed between deflector 40 and the leading edge of deflector 52 and defines an angle G with respect to centerline 31 which is generally in the range of about 22 to about 32 degrees and preferably about 27.6 degrees. Tube 110 is formed between deflector 52 and the leading edge of deflector 60 and forms angle J with respect to centerline 31. Preferably, angle J is in the range of about 24 to about 34 degrees and more preferably about 28.9 degrees. Finally, tube 116 is formed between deflector 60 and turning member 68 and forms an angle M with respect to centerline 31, which is generally in the range of about 25 to about 35 degrees and preferably about 30.3 degrees.

As illustrated in FIG. 1, tubes 100–116 generally curve as they traverse from air passage 32 into their respective air channels 38, 50, 58 and 66. The configuration of the tubes allows for turning of the fluid without substantial loss of pressure head and velocity. As one skilled in the art can appreciate, the angle of the tubes with respect to centerline 31 and the generally curved configurations of the tubes allow the air passing through the vane to turn from air passage 32 into the air channels at a high velocity. This is an improvement over the prior art vanes which require orifices with much higher pressure losses as air flow passes through the vane.

Therefore, as one skilled in the art can appreciate, the generally curved configuration of tubes 100–116 may be important. In a preferred embodiment of the invention, tubes 100–116 are suitably defined by the relative relationship of the turning members and channel deflectors with respect to one another and preferably evidence angles in the range of about 100 to about 170 degrees. In particular, the angles of tubes 100–116 are defined as the relative angles created by the intersection of the center lines of the tubes. For example, as illustrated in FIG. 1, center lines 100a and 100b are the center lines of the first and second portions of tube 100 respectively. The angle of tube 100 is measured as the relative angle of center lines 100a and 100b.

Referring now to each specific tube 100–116, tube 100 is formed between first side 16 and first outer turning member 42. As tube 100 extends from air passage 32 to channel 38, it curves, thus evidencing an angle D. Preferably, angle D is in the range of about 100 to about 160 degrees and more preferably about 141.2 degrees. Preferably, tubes 102, 104, 106, 110, 112 and 116 evidence similar curved or angled configurations. The angled orientation of tubes 102, 104, 106, 110, 112 and 116 are suitably defined by angles F, H, K and N respectively and are enumerated as follows: angle F is generally in the range of about 100 to about 160 degrees, and preferably about 130.6 degrees; angle H is generally in the range of about 100 to about 160 degrees and preferably about 127.9 degrees; angle K is generally in the range of about 100 to about 160 degrees and preferably about 121 degrees; and angle N is generally in the range of about 100 to about 160 degrees and preferably about 120.3 degrees.

In accordance with a further aspect of a preferred embodiment, air flow tube 104 divides at first inner turning member 54, creating tubes 106 and 108. In particular, tube 106 is suitably formed between channel deflector 40 and turning member 54, and tube 108 is suitably formed between turning member 54 and channel deflector 52. Tube 104 and 108 communicate with each other, forming an angle I at the communication point. In a preferred embodiment, angle I is generally in the range of about 25 to about 45 degrees, and more preferably about 29.5 degrees. Similarly, tube 110 divides at second inner turning member 62 to form tubes 112 and 114. Tube 112 is suitably formed between deflector 52 and turning member 62, and tube 114 is suitably formed between turning member 62 and deflector 60. The communication of tubes 110 and 114 forms an angle L which is preferably in the range of about 25 to about 45 degrees and more preferably about 36.8 degrees.

In accordance with a further aspect of a preferred embodiment of the invention, channel deflectors 40, 52, and 60 are suitably positioned such that channels 38, 50, 58, and 66 comprise specific percentages of the overall inner cooling cavity 30. Preferably, first channel deflector 40 is positioned such that first air channel 38 comprises about 20 to about 50 percent of cavity 30, and more preferably about 30 percent. Similarly, second channel deflector 52 is positioned relative to deflectors 40 and 60 such that second air channel 50 preferably comprises about 20 to about 50 percent of cavity 30, and more preferably about 25 percent. In the same manner, third air channel 58 preferably comprises about 20 to about 50 percent of cavity 30, and more preferably about 25 percent, and fourth channel 66 preferably comprises about 20 to about 50 percent, and more preferably about 30.

Figure 2:
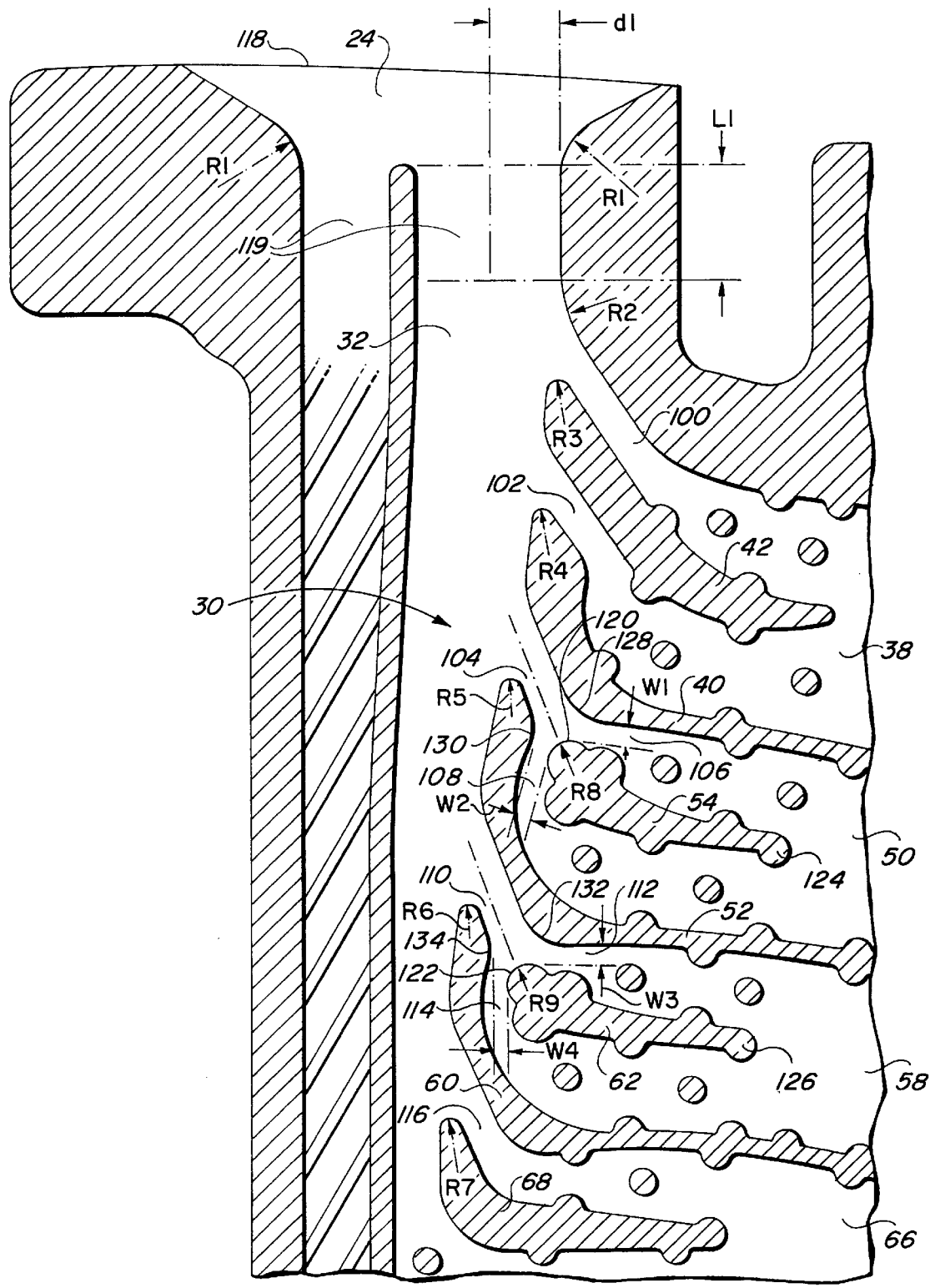
FIG. 2 shows a portion of the inner cooling cavity of FIG. 1 enlarged to depict with greater clarity the inner air passage and the shape and configuration of the channel deflectors and turning members.

During operation of the turbine engine, cool air will first flow into air inlet 24. The particular contour and shape of air inlet 24 helps stabilize the air flow as it passes into first air passage 20 and second air passage 32. Referring now to FIG. 2, the radius R1 of inlet 24, which connects the mouth 118 of inlet 24 to the neck 119 of inlet 24, generally will help promote stable flow of the air as it enters air passages 20 and 32. In a preferred embodiment of the invention, R1 may be in the range of about 0.04 to about 0.25 inches, and preferably as large as possible. In addition, to also help stabilize the air as it enters air passages 20 and 32, the length of inlet neck 119 (L1 in FIG. 2) is preferably as long as possible. In a preferred embodiment of the present invention, L1 will be at least twice the length of the equivalent diameter of of the desired flow area air passage 32 (d1 in FIG. 2).

As air flows through neck 119 into second air passage 32, a portion of the air will flow through tubes 100 and 102 into first air channel 38. The size of tubes 100 and 102, the angle at which they are located with respect to air passage 32, and the radius R2 of first side 16 should help control the amount of air that flows through the tubes. As discussed above, the angle of tubes 100 and 102 with respect to air passage 32 is preferably in the range of about 20 to about 45 degrees.

Still referring to FIG. 2, radius R2 is formed on the inner wall of first side 16 and forms the top of tube 100. If radius R2 is too small, the entry of air into tube 100 will be disrupted, and first channel 38 will not be properly cooled.

Similarly, if radius R2 is too large, too much air will flow through tube 100, taking air away from the other air channels. In a preferred embodiment of the invention, radius R2 preferably is in the range of about 0.100 to about 0.250 inches and more preferably about 0.180 inches.

The length of tube 100 is also a factor controlling the flow of air through the tube. Referring now to FIG. 3, in a preferred embodiment of the invention, the length L5 of tube 100 will preferably be at least twice the width W5 of tube 100. Therefore, length L5 will be in the range of about 0.04 to about 0.10 inches and preferably about 0.08 inches.

Now referring back to FIG. 2, the size of the radii R3–R7 of the leading edges of the turning members and channel deflectors also are factors in controlling the air flow into each of the tubes. To ensure that the length of tubes 100, 102, 104, 110 and 116 are as large as possible, radii R3–R7 will preferably be as small as possible. Due to manufacturing constraints, radii R3–R7 preferably will be in the range of about 0.010 to about 0.015 inches and more preferably about 0.012 inches.

Referring now to second channel 50 and third channel 58, air or fluid will enter channels 50 and 58 from air passage 32 through tubes 104 and 110 respectively. As the air or fluid flows through tubes 104 and 110, it will collide with turning members 54 and 62 respectively, causing the fluid to separate. The fluid entering tube 104 will divide equally into tubes 106 and 108, and the fluid entering tube 110 will divide into tubes 112 and 114; alternatively, the tubes can be sized so that the split in flow is not equal. For proper fluid flow from air passage 32 through tubes 104 and 110 into channel 50 and 58, turning members 54 and 62 should be properly aligned within the channels. In a preferred embodiment of the invention, the width of the leading edges 120 and 122 of turning members 54 and 62 should be slightly wider than tubes 104 and 110, respectively. Moreover, for fluid to separate equally into tubes 106 and 108, and 112 and 114, leading edges 120 and 122 should be centered along tubes 104 and 110, respectively.

For proper fluid distribution into tube 106, 108, and 112, 114, radius R8 of turning member 54, radius R10 of deflector 40 and radius R11 of deflector 52 will preferably be symmetrical about the centerline of tube 104 (see FIG. 3). That is, if radii R8, R10 and R11 are extended out, they will all intersect at the centerline of tube 104. Preferably, radii R9, R12 and R13 of turning member 62 and deflectors 52 and 60 respectively will be similarly symmetrical about the centerline of tube 110.

Finally, the widths of tubes 106, 108, 112 and 114 help control the amount of fluid that enters into channels 50 and 58. Referring back to FIG. 2, the opening of tube 106 is suitably formed between the leading edge 120 of turning member 54 and the lower corner 128 of first channel deflector 40. The width of this opening is illustrated in FIG. 2 as W1. Similarly, the opening of tube 108 is suitably formed between leading edge 120 and first upper corner 130 of second channel deflector 52 and is shown as W2 in FIG. 2. The openings of tubes 112 and 114 are suitably formed between turning member 62 and corners 132 and 134 of channel deflectors 52 and 60 respectively with the widths being shown as W3 and W4. In a preferred embodiment of the present invention, widths W1–W4 of the tubes 106, 108, 112 and 114 preferably will be based on velocities required to cool the passage. In the preferred embodiment, widths W1–W4 will be in the range of about 0.01 to about 0.05 inches and more preferably about 0.03 inches.

As air flows out of tubes 106 and 108 into second air channel 50, and out of tubes 112 and 114 into third air channel 58, the air disperses throughout channels 50 and 58. To ensure even air coverage of the aft portions the channels 50 and 58, the aft ends 124 and 126 of turning members 54 and 62 are suitably positioned at the center of channels 50 and 58 to properly direct the air to all parts of each channel. That is, aft end 124 of turning member 54 is generally centered between first channel deflector 40 and second channel deflector 52, and aft end 126 of turning member 62 is generally centered between second channel deflector 52 and third channel deflector 60.

Referring now to FIG. 4, as air or fluid flows through second air passage 32, portions of the air separate out and flow into the various air channels. As the amount of air in passage 32 decreases, the air velocity will also decrease. To help maintain the proper velocity throughout the entire inner cavity 30, air passage 32 tapers down from the inlet to the exit end of the passage. In addition, to help maintain velocity and ensure the proper amount of air flow into each channel, the leading edge of second channel deflector 52 is angled such that if the leading edge is extended back, it would overlap the leading edge of third channel deflector 60 (see 140 in FIG. 4). In a similar manner, the leading edge of channel deflector 60 is angled such that it would overlap second outer turning member 68.

In addition to the channel deflectors and turning members, inner cavity 30 may contain a plurality of air deflecting pins 142 and half pins 144 suitably configured to direct the air as it flows through cavity 30. Pins 142 are suitably sized and positioned in each channel to direct and separate the cooling flow within each channel. In a preferred embodiment of the present invention, the spacing between pins 142 from center to center (L2 in FIG. 4) preferably is in the range of about 1.5 to about 5 diameters of the pins 142 and more preferably about 2.5 diameters. In accordance with a further aspect of the present invention, the spacing from the edge of pins 142 to the inner walls, turning members, and channel deflectors (L3 in FIG. 4) is preferably in the range of about 1.5 to about 5 pin diameters and more preferably about 2.5 pin diameters. It should be noted that some of the pins may not meet the pin spacing specifications enumerated above. For example, in the preferred embodiment, pins 146–156, which are marked with an X on FIG. 4, do not meet the pin spacing specifications. Moreover, it should be noted that pins 142 may be placed at any and all locations within cavity 30 necessary to obtain proper flow distribution, or pins 142 may be randomly placed in cavity 30.

Half pins 144 extend from the inner walls of first and second sides 16, 18 and from the various turning members and channel deflectors and are configured to direct the air as it flows through the various channels. In a preferred embodiment of the invention, half pins 144 preferably may be placed at any location on the walls, turning members, and channel deflectors necessary to properly direct the air flow within the air channels.

Figure 5:
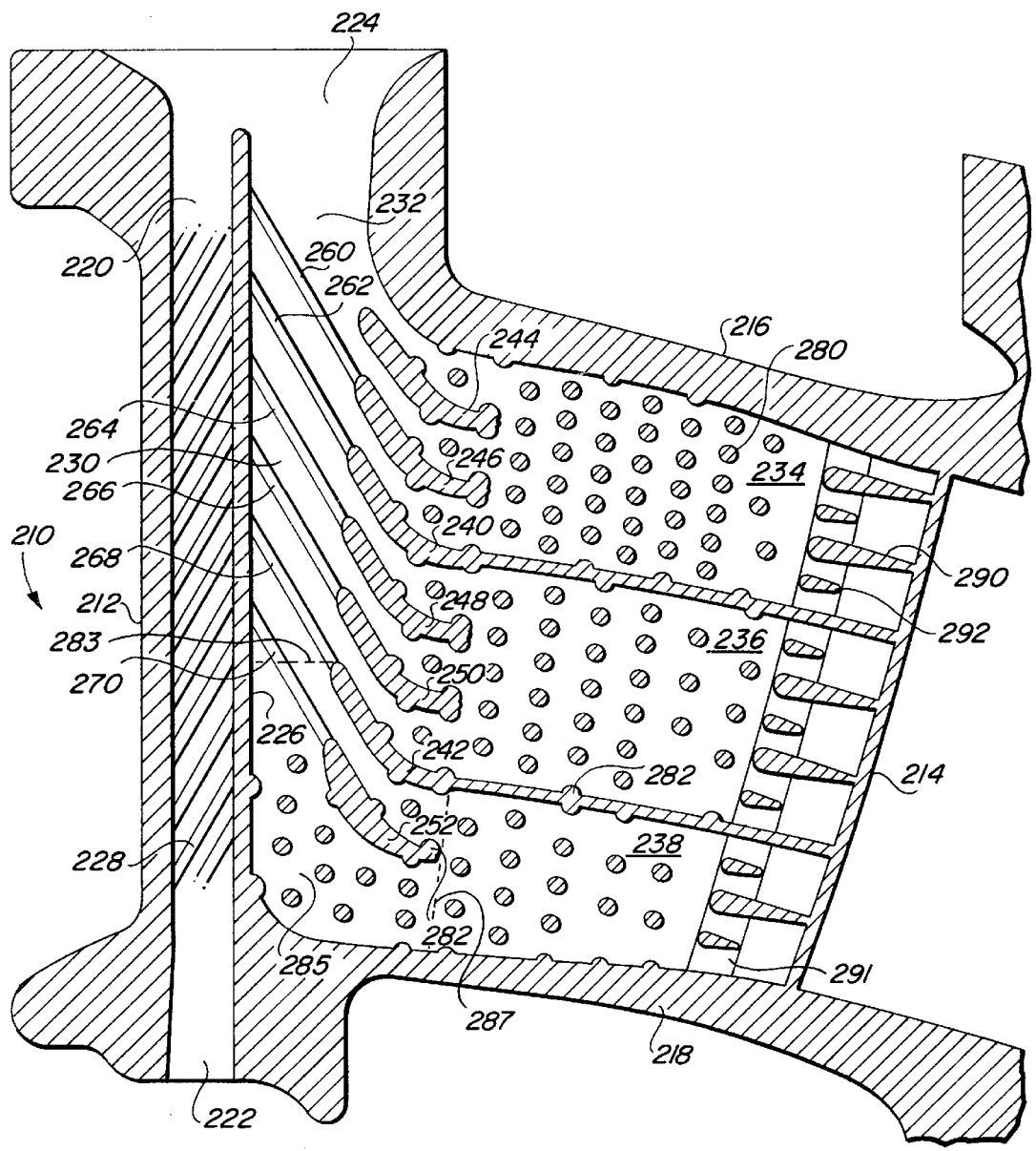
FIG. 5 is a cross-sectional view showing the inner cooling area of a gas turbine vane which embodies a second embodiment of the present invention.

With reference to FIG. 5, a vane 210 in accordance with a second preferred embodiment will now be described. Vane 210 comprises a leading edge 212, a trailing edge 214, a first side 216, a second side 218, a first air passage 220 and an inner cooling cavity 230 disposed in the aft portion of the vane 210. Air passage 220 extends from first side 216 to second side 218 adjacent the leading edge 212 and is separated from the cavity 230 by a divider wall 226. The portion of the vane 210 between the divider wall 226 and the trailing edge 214 is referred to as the aft portion. An opening 224 in side 216 permits cooling air to split at the divider wall 226 and then enter the air passage 220 and another air passage 232 that leads to the cavity 230. Alternatively, the opening 220 can be through side 218. Air passage 220 has a turbulator 228 extending from its inner wall. Alternatively, the air passage 220 may have a conventional impingement or serpentine cooling configuration.

In a fashion similar to vane 10, air passage 232 communicates with and feeds a plurality of air channels 234, 236, and 238 which are generally defined by channel deflectors 240 and 242, which extend from air passage 232 to the trailing edge 214. Disposed between side 216 and channel deflector 240 are two generally equally spaced turning members 244 and 246. Though the minimum throat openings may vary with the particular airfoil design, in the preferred embodiment the minimum throat opening between side 216 and member 244 is 0.026 inches. The minimum throat opening between member 244 and member 246 and between member 246 and deflector 240 is 0.027 inches. Two more turning members 248 and 250 are generally equally spaced between channel deflector 240 and 242, and the respective minimum throat openings starting with the opening between deflector 240 and turning member 248 are 0.028 inches, 0.029 inches, and 0.031 inches. Finally, disposed between side 218 and channel deflector 242 is turning member 252 having a minimum throat opening therebetween of 0.033 inches.

As illustrated in FIG. 5, the turning members 246, 248, 250 and 252 along with channel deflectors 240 and 242 each have a conventional turbulator (also referred to as a trip strip) extending from the respective leading edges to the divider wall 226. Turning member 244 does not have a turbulator. A turbulator is a small bump or ridge extending from the inner surface of airfoil 210 that causes the boundary layer of the air flowing across the turbulator to separate and thus enhance heat transfer.

Channels 234, 236, and 238 are preferably provided with a plurality of air deflecting pins 280 and half pins 282, similar to pins 142 and half pins 144 described with respect to vane 10. Pins 280 and half pins 282 are suitably sized and positioned in each channel to direct and distribute the cooling flow therein. In addition, a plurality of pins 280 and half pins 282 are disposed in a transition region 285. The transition region 285 extends from an inlet represented by dashed line 283 to an exit represented by a second dashed line 287. Disposed within the transition region 285 is turning member 252 which is configured so that the pressures on both of its sides at the exit 287 are equal. It should be appreciated that the term "half pins" as used herein refers to a pin having less than a full circular cross section. For example three-quarter or quarter circular cross sections may be acceptably employed in the context of various aspects of the present invention.

Referring once again to FIG. 5, the channels 234, 236, 238 terminate at a slot 291 that extends from side 216 to side 218 and is offset from the trailing edge 214. Cooling air flowing through these channels exits the airfoil 210 through this slot 291. The slot 291 may discharge to either the pressure or suction side of the airfoil. Disposed within the cavity 230 and spanning across the slot 291 are a plurality of tear drop shaped flow separators 292 that extend the width of the slot and tear drop shaped flow separators 290 that extend all the way to the trailing edge 214. The flow separators 290, 292 are generally equally spaced from each and are arranged so that the separators 290, 292 alternate, except where the aft portion of a channel deflector 240, 242 crosses the slot 291.

It will be understood that the foregoing description is of preferred exemplary embodiments of the invention, and that all dimensions are given for the preferred embodiments. One skilled in the art should appreciate that the dimensions may vary in other embodiments of the invention. In particular, as the overall size of the airfoil varies the inner dimensions of the airfoil will vary accordingly. Moreover, the invention is not limited to the specific forms shown herein. Various modifications may be made in the design and arrangement of the elements set forth herein without departing from the scope of the invention as expressed in the appended claims.

What is claimed is:

1. An airfoil comprising:
  an air inlet opening positioned at a first side of the airfoil;
  a first air passage extending along a leading edge of the airfoil from the first side to a second side, wherein the first air passage communicates with the air inlet opening and terminates at the second side; and
  an inner cooling cavity positioned between the first air passage and a trailing edge and separated from the first air passage by a divider wall, wherein the inner cooling cavity comprises:
    a first channel deflector, and a second channel deflector each of which extend through the inner cooling cavity from the trailing edge toward the divider wall separating the first air passage from the inner cooling cavity;
    a first turning member positioned between an inner wall of the first side and the first channel deflector;
    a second turning member positioned between the first channel deflector and the second channel deflector;
    a third turning member positioned between the second channel and an inner wall of the second side; and
    at least one turbolator extending from at least one of the channel deflectors and at least one of said turning members.

2. The airfoil of claim 1, wherein the inner cooling cavity includes a plurality of pins positioned throughout the cavity.

3. The airfoil of claim 2 wherein at least one of said first and second sides and at least one of said first and second channel deflectors each has at least one half pin extending therefrom.

4. The airfoil of claim 3, wherein at least one of said turning members has a half pin extending therefrom.

5. The airfoil of claim 1, wherein the first side, the first channel deflector, the second channel deflector, and the second side form a plurality of air channels, each air channel having a plurality of pins disposed therein.

6. An airfoil comprising:
  an air inlet opening positioned at a first side of the airfoil;
  a first air passage extending along a leading edge of the airfoil from the first side to a second side, wherein the first air passage communicates with the air inlet opening and terminates at the second side; and
  an inner cooling cavity positioned between the first air passage and a trailing edge and separated from the first air passage by a divider wall, wherein the inner cooling cavity comprises:
    a first channel deflector, and a second channel deflector each of which extend through the inner cooling cavity from the trailing edge toward the divider wall separating the first air passage from the inner cooling cavity;

a first turning member positioned between an inner wall of the first side and the first channel deflector;

a second turning member positioned between the first channel deflector and the second channel deflector;

a third turning member positioned between the second channel and an inner wall of the second side;

a slot through a surface of said airfoil and extending from said first side to said second side offset from said trailing edge and in fluid communication with said inner cooling cavity; and a plurality of tear drop shaped flow separators disposed in said cavity and spanning across said slot.

7. The airfoil of claim 6 wherein a first portion of said plurality of flow separators extend the width of the slot.

8. The airfoil of claim 7 wherein a second portion of said plurality of flow separators extend to said trailing edge.

9. The airfoil of claim 6 wherein at least one turbolator extends from at least one of the channel deflectors and at least one of said turning members.

10. The airfoil of claim 9 wherein the inner cooling cavity includes a plurality of pins positioned throughout the cavity.

11. The airfoil of claim 10 wherein at least one of said first and second sides and at least one of said first and second channel deflectors each has at least one half pin extending therefrom.

12. The airfoil of claim 11 wherein at least one of said turning members has a half pin extending therefrom.

13. The airfoil of claim 6 wherein the first side, the first channel deflector, the second channel deflector, and the second side form a plurality of air channels, each air channel having a plurality of pins disposed therein and in fluid communication with said slot.

* * * * *